United States Patent [19]
Vossler

[11] Patent Number: 6,018,775
[45] Date of Patent: Jan. 25, 2000

[54] SYSTEM WITH A REMOTE WIRELESS MASS STORAGE WHICH PROVIDES IDENTIFICATION OF A PARTICULAR MASS STORAGE STORED IN A CRADLE TO THE SYSTEM

[75] Inventor: Stephen P. Vossler, Sioux Falls, S. Dak.

[73] Assignee: Gateway 2000, Inc., North Sioux City, S. Dak.

[21] Appl. No.: 08/677,459

[22] Filed: Jul. 2, 1996

[51] Int. Cl.[7] ...................................................... G06F 13/14
[52] U.S. Cl. ........................... 710/1; 375/295; 340/825.25
[58] Field of Search ............................. 395/821; 370/461, 370/468; 375/295; 340/825.25; 710/1

[56] References Cited

U.S. PATENT DOCUMENTS

| | | | |
|---|---|---|---|
| 5,150,465 | 9/1992 | Bush et al. ................................ | 395/302 |
| 5,181,200 | 1/1993 | Harrison .................................. | 370/468 |
| 5,214,774 | 5/1993 | Welsch et al. ........................... | 455/1.1 |
| 5,237,663 | 8/1993 | Srinivasan ............................... | 395/306 |
| 5,253,133 | 10/1993 | Guo ....................................... | 360/97.01 |
| 5,257,254 | 10/1993 | Kutargi .................................... | 369/50 |
| 5,283,638 | 2/1994 | Engberg et al. .......................... | 348/14 |
| 5,297,142 | 3/1994 | Paggeot et al. .......................... | 370/461 |
| 5,307,297 | 4/1994 | Iguchi et al. ............................ | 364/708.1 |
| 5,333,277 | 7/1994 | Searls ..................................... | 395/281 |
| 5,349,386 | 9/1994 | Borchardt et al. ....................... | 348/485 |
| 5,408,506 | 4/1995 | Mincher et al. ......................... | 375/256 |
| 5,430,847 | 7/1995 | Bradley et al. .......................... | 395/310 |
| 5,438,671 | 8/1995 | Miles .................................. | 395/200.77 |
| 5,448,700 | 9/1995 | Kim ....................................... | 395/310 |
| 5,479,479 | 12/1995 | Braitberg et al. ........................ | 455/404 |
| 5,652,766 | 7/1997 | Matsumura et al. ..................... | 375/295 |
| 5,678,562 | 10/1997 | Sellers .................................... | 600/523 |
| 5,732,074 | 3/1998 | Spaur et al. ............................. | 370/313 |
| 5,787,459 | 7/1998 | Stallmo et al. .......................... | 711/112 |

OTHER PUBLICATIONS

Howard Eglowstein, "Photonics' Wireless Infrared to Link Your Computers", Networking on a Beam of Light, Byte Magazine, Oct. 1994.

*Primary Examiner*—Thomas C. Lee
*Assistant Examiner*—Abdelmoniem I. Elamin
*Attorney, Agent, or Firm*—Schwegman, Lundberg, Woessner & Kluth P.A.; Anthony Claiborne

[57] ABSTRACT

A mass storage device having a transmitter and receiver and a computer having a transmitter and receiver allows for a computer system capable of wireless transmissions of data to and from the computer. The transmitter and receiver of the computer is linked to a data and command bus which is electrically connected to the central processor or microprocessor of the computer. The transmitter and receiver of the mass storage device is electrically connected to the data channel of the mass storage device. A cache memory may also be included to meter the data before transmission or after receiving the transmission. The transmitter and receivers transmit information within a selected range within the full range of electromagnetic radiation. A cradle or nest for holding a mass storage unit and providing power to the mass storage provides stand alone capability to the mass storage unit. The cradle can also be provided with a transmitter and receiver so that drives without wireless capability can now have such capability.

1 Claim, 11 Drawing Sheets

SYSTEM WITH A REMOTE WIRELESS MASS STORAGE WHICH PROVIDES IDENTIFICATION OF A PARTICULAR MASS STORAGE STORED IN A CRADLE TO THE SYSTEM

FIELD OF THE INVENTION

The present invention is related to computer systems and computer peripheral devices. In particular, the present invention is related to mass storage devices used to store information representing data.

BACKGROUND OF THE INVENTION

Several current trends are effecting the design of computer system products. One trend is that televisions and entertainment centers are increasingly being controlled by microprocessors. In other words, home televisions and entertainment centers are becoming more intelligent. Microprocessors are being placed in individual components and several different microprocessors in the different components are performing the same or similar functions. Another trend is that microprocessors are also becoming more affordable and more able to handle many different types of operations in parallel. The current trend is to avoid the duplication of functionality by applying a more powerful microprocessor to integrate the operations for the various home entertainment components. The prediction that the television and computer are essentially merging into one unit is now becoming a reality. One currently available system is a product available from Gateway 2000 called the Destination product.

Gateway 2000's Destination product is a multipurpose computer system provided with circuitry to control consumer electronics, such as a large monitor or television for group interaction and of text, graphics and video in a home entertainment environment. The circuitry provides audio and video tuning capability for display of received high quality video signals on the monitor without an intermediate conversion to a lower quality NTSC format. The circuitry decodes the received video signals and converts them to VGA format which provides images of higher quality than NTSC. The monitor is capable of directly displaying VGA signals, and is not required to have a television tuner circuit, remote control, or audio circuitry. This significantly reduces the cost of the monitor and improves the quality of display as opposed to typical large screen televisions which contain complex tuning circuitry.

In one embodiment of the Destination product from Gateway 2000, high quality video signals are received from satellites broadcasting digital video signals, digital cable signals and other wireless digital broadcasts. One example is direct broadcasting satellite "DBS" signals having a quality of video signal higher than that provided by NTSC broadcasts. The DBS signals are MPEG-compressed video, audio and data. The DBS signals are received by a video receiver circuit board which is compatible with a standard personal computer peripheral component interconnect (PCI) bus and fits within the chassis of a personal computer. The video receiver cards have panel connectors for receiving coax cable from an antenna which directly receives the DBS signals. The card has functional blocks comprising a satellite tuner, digital demodulator, forward error correction, conditional access and decryption/demultiplexing. The demultiplexor provides the capability of receiving data packets which range from information on television programs being broadcast, to computer programs for downloading into computer memory.

The video receiver card outputs digital video, audio and data streams onto the peripheral component interconnect "PCI" bus where it can be accessed by the computer main processor for manipulation and storage. When stored in a personal computer memory, the program information may be organized in a commercially available database format. This permits the use of database functions to be applied to the data. Rather than being stuck viewing the program information as provided by the broadcaster, the data immediately becomes manipulable by database commands, allowing queries of program information. Searches are used to show programs having certain actors or subject matter, and even have programs meeting the query automatically recorded. One use entails a user designating a series to be recorded, and the database keeps track of what has been recorded or already viewed, avoiding duplicate recording, as well as providing easy access to the recorded programs. In general, by capturing data along with video and audio in a form which a personal computer can process, the possibilities for computer applications are endless. Interaction with movies, classrooms, other players of games such as golf and a host of other possibilities becomes clear.

One such possibility with a merged TV and computer system such as Gateway 2000's Destination product is that closed caption information provided in video signals can be captured, and stored in the database for searching. This provides the ability to instantly find current programming related to events that a user defines an interest in by searching the data base.

A video graphics adapter (VGA) card coupled to the PCI bus converts the digital data stream into VGA and video signals for display on the monitor. In addition to being a home entertainment system, a fully functional computer system forms the heart of the entertainment system. Instead of buying all the individual consumer electronics parts, such as a large screen television, settop box for receiving broadband video, audio amplifier/receiver, CD player, universal remote control, video game machine, answering machine and fax, and a personal computer as some consumers do today, they need only buy the Destination system from Gateway Several years ago remote control television sets outsold the non remote control television sets. Controlling televisions and now super intelligent televisions from the users couch or comfortable chair is no longer a trend. Remote control of such components is the now the norm. The Destination product from Gateway 2000 provides support for remote control of both the personal computer and the monitor functions. Both a handheld remote control, and a full function remote keyboard having standard television and video cassette recorder controls are provided. Both transmit key signals identifying the key pressed, as well as a signal identifying the source of the key signal. The key signals are preferably RF signals typically in the megahertz range, but can also be IR or other suitable form of radiation. RF signals have the advantage over infrared "IR" signals in that they are not interrupted by someone walking between the remote and the receiver. Light source interference and jamming of other IR receivers is minimized by using RF signals. It may also be used in a different room from the receiver.

The personal computer in the Destination product from Gateway 2000 contains suitable receiving circuitry, which provides indications of the keys being pressed, with the identity of the remote control device sending the signal. In one embodiment, an industry standard architecture (ISA) board or module is plugged into both the keyboard and mouse ports. Another bus, such as a serial, RS232 or microchannel bus may also be used. The board contains RF receiver circuitry which receives the RF signals, decodes them and routes them to the appropriate port for processing. A receiving module is programmed to distinguish between the sources of the remote control transmitted signals, and directs keystrokes to the keyboard port, and mouse movements to the mouse port. Thus as can be seen, the computer system and television merged with it can be completely controlled from the user's couch or comfortable chair.

The only reason a person has to get up from the couch or easy chair is to load a different floppy disk into a floppy or flexible disk drive, or to load a different CD into a CD ROM drive. This is somewhat inconvenient since all operations, with the exception of loading media, can be completely controlled from across a room. Getting up from the users comfortable chair to load a new CD or floppy is necessary since most mass storage devices are hardwired inside the computer system.

SUMMARY OF THE INVENTION

An apparatus and method provides for remote access between a mass storage device and a computer or an integrated computer and television set. The apparatus and method allow computer users to place a mass storage device in a convenient location, such as near an easy chair or other comfortable location from which they are controlling the computer or integrated computer and television set, so the media can be changed at that location. This affords the computer user the luxury of complete control from the location of his or her choice. With this innovation, the computer user merely has to insert a new CD or floppy into a drive located right at the user's location. The user doesn't have to move to have complete control of the system.

A computer is provided with a transmitter/receiver that operates in a selected portion of the electromagnetic spectrum. The mass storage device is also provided with a transmitter/receiver that operates in a selected portion of the electromagnetic spectrum. The computer generates read and write commands and sends them to the transmitter/receiver associated with the computer. The transmitter/receiver then transmits the command to the transmitter/receiver associated with the remote mass storage device. The remote mass storage device completes the command and sends information indicating that a write command has been completed or that a read command has been completed and transmits the data retrieved to the computer. The transmitter/receiver on each end is attached to a cache memory so that commands and data can be taken out of the cache at a rate which correlates to the rate associated with the particular portion of the electromagnetic spectrum used for transmitting information. In addition, associated with each transmitter/receiver is a hardware or software error correction code device for encoding the data or commands to be sent or decoding and correcting commands that have been received by the transmitter/receiver. The remote mass storage device can be any type of memory device including a floppy disk drive, a CD-ROM drive, a magneto-optical disk drive, a hard drive with portable media such as is available from Syquest Technology, or any other mass storage device with removable media. In addition, the transmitter/receiver used in the computer and the transmitter/receiver used by the mass storage device can operate in any selected portion of the electromagnetic spectrum including radio frequency (RF) or infrared (IR).

In addition, the apparatus and method allows for remote computing at the convenience of the computer user. Providing the computer and the mass storage device with transmitter/receivers allows for wireless transmissions of commands and data. The mass storage device no longer has to be hard wired to the computer which liberates the user in terms of mobility. It also allows for real time updates of information stored on mass storage devices and retrieved from them.

BRIEF DESCRIPTION OF THE DRAWINGS

For a better understanding of the present invention, reference may be made to the accompanying drawings in which.

DESCRIPTION OF THE EMBODIMENT

In the following detailed description of the embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Figure 1:
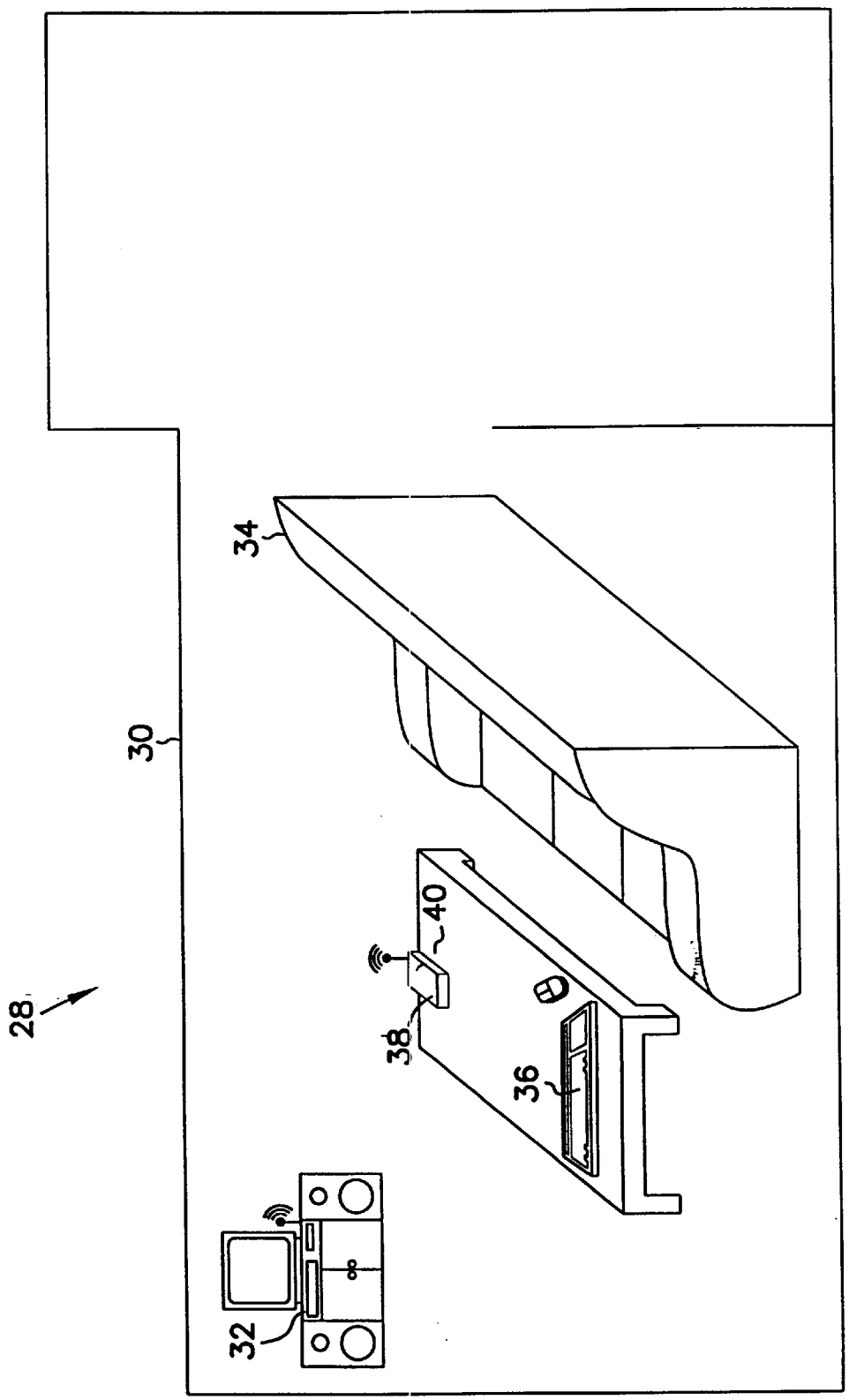
FIG. 1 is a pictorial plan of a home having an integrated personal computer and entertainment center which has a remote storage device.

FIG. 1 shows a pictorial plan of a house 28 having a room or an office 30 containing a computer and entertainment center 32 using embodiments of the present invention. The particular room includes a comfortable spot 34, such as a couch, from which to remotely control the computer and entertainment center. The room contains a remote keyboard 36 positioned near the comfortable spot 34. A remote mass storage drive 38 is located at the comfortable spot 34. One or more mass storage units (not shown in FIG. 1), such as a removable media drive, is in electrical contact or hard wired to the computer 32. The remote mass storage device 38 is located in a place convenient to the user such as the portion of the room from which the user remotely controls the computer 32. Although not shown in FIG. 1, associated with the remote mass storage unit 38 is a transmitter and receiver operating in a selected portion of the electromagnetic spectrum. A transmitter and receiver, operating in the same selected portion of the electromagnetic spectrum, is also associated with the computer 32. The details of these particular transmitters and receivers and how they are attached to the various mass storage units and computers will be further detailed in the following paragraphs by referring to the figures.

At this point, a short general overview regarding how such a system would operate is thought to be helpful in providing the reader with a general understanding of the invention. Periodically, the computer 32 will poll the transmitter and receiver for all devices which are transmitting to the computer's transmitter and receiver. When an unknown device is found, such as a new remote mass storage unit, the computer system will name the device. Thus, more than one such remote mass storage unit may be used by a computer system. Each will be named separately. When a file or data is needed from the remote mass storage unit 38, the requesting computer, for example computer 32, transmits the request or command to the remote mass storage device. The remote mass storage device fills the request and then transmits it back to the requesting computer 32. The computer 32 and the mass storage unit 38 or units, if more than one is present, typically use the same portion of the electromagnetic spectrum to broadcast signals carrying data or commands requesting storage of data or retrieval of data. The computer 32 and the mass storage device can also be provided with several transmitter/receivers so that one of the devices can transmit or receive information from several types of transmitter/receivers such as radio frequency waves or infrared light. The transmitter/receiver will have error correction capability associated with it. When transmitting data, it can then be encoded or error correction information can be added to the end of certain blocks of data. Cyclical redundancy checks and Reed Solomon codes, and other code schemes may be used to check data and assure that it was transmitted properly.

When a user is searching for a particular file or requests to view all the files on a particular drive, the remote mass storage device would be designated using the file, directory and tree structure used in DOS applications and presentation managers, such as Windows, that operate on top of DOS. In other words, a user will designate a remote drive with a letter just as though it was part of the computer system. The user will be able to use DOS commands to find directories and subdirectories in the remote drive. If the user is using Windows, the user can use tools such as File Manager just as though the remote drive was hard wired to the bus as part of the computer system.

Figure 2:
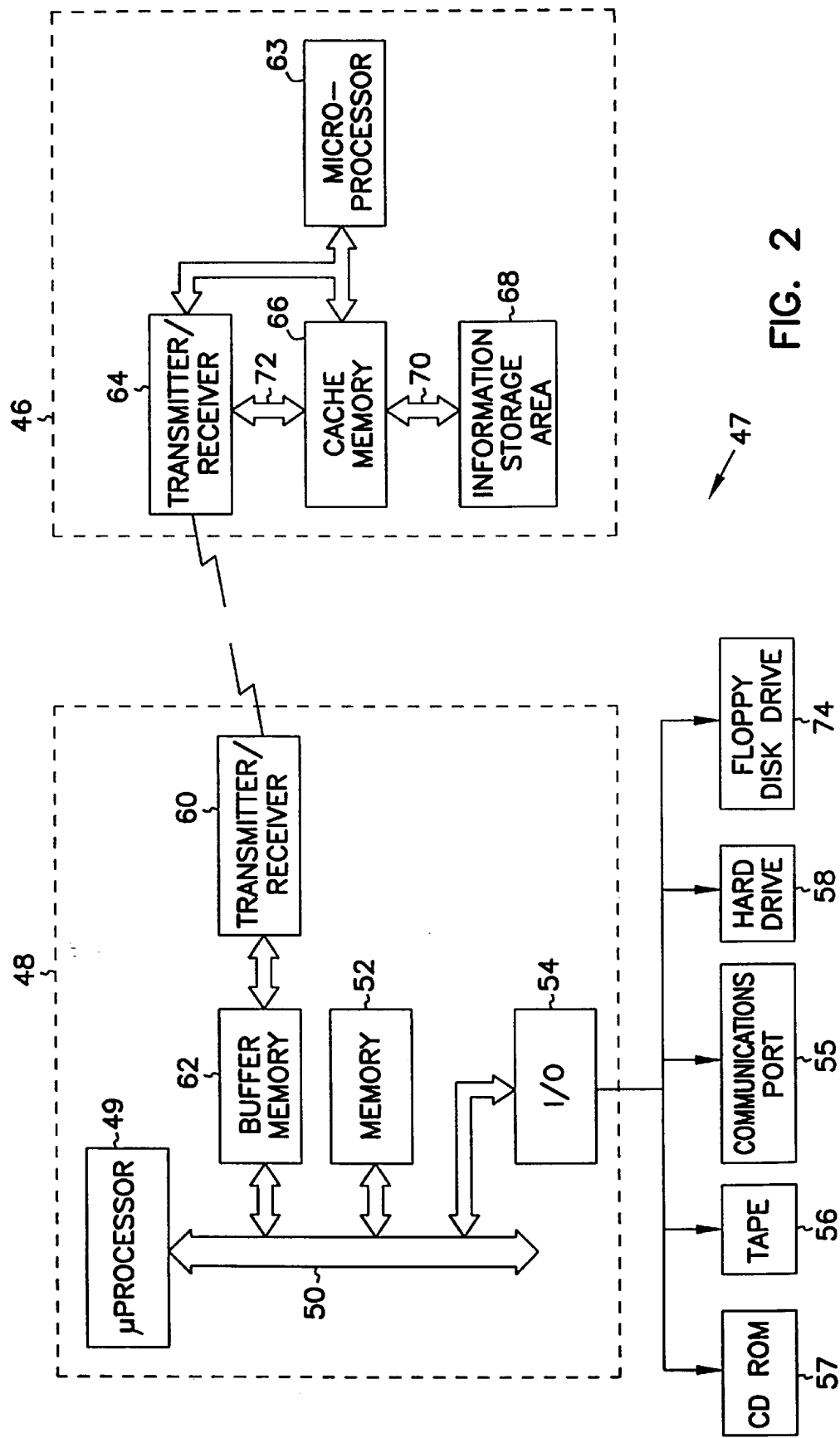
FIG. 2 is a block diagram of a computer system and a mass storage device.

Now turning to FIG. 2, the details of one computer and one remote mass storage unit will be discussed. FIG. 2 is block diagram of a computer 48 and a block diagram of a remote mass storage unit 46. Computer 48 includes a CPU or microprocessor 49 and a data and command bus 50 along which data and commands flow to various components attached to the bus. Attached to the bus is memory 52 and an input/output processor 54. Attached to the input/output processor 54 are various items such as a communications port 55, tape storage 56, a CD-ROM drive 57, a hard drive 58 and a flexible disk drive 74. Also attached to the data and command bus 50 is a transmitter/receiver 60. Attached between the transmitter/receiver 60 and the data and command bus 50 is a FIFO or buffer memory 62. The transmitter/receiver operates in a portion of the electromagnetic spectrum to broadcast signals carrying data or commands. The data and commands are held in a buffer or FIFO memory 62 so that they can be metered out at a rate that corresponds to the bandwidth associated with the transmitter/receiver 60. It should be noted that the transmitter/receiver 60 and buffer memory 62 could also be attached to the data and command bus 50 through the input/output processor 54.

The mass storage unit 46 includes a microprocessor 63, a transmitter/receiver 64, a cache memory 66, and an information storage area 68. The microprocessor 63 can be a state machine, a controller, hardwired logic or a dedicated microprocessor. The microprocessor 63 controls the flow of information and commands into and out of the remote mass storage device 46. Transmitter/receiver 64 operates in the same portion of the electromagnetic spectrum as the transmitter/receiver 60 of the computer 48. The transmitter/receiver 64 receives data and commands from the transmitter/receiver 60 or sends data back to the transmitter/receiver 60. The information that is transmitted by transmitter/receiver generally comes from the information storage area 68 by way of cache memory 66 and the processor 63. The rate at which the cache memory delivers information to the transmitter/receiver corresponds to the bandwidth associated with transmitter/receiver 64. In many instances, the data rate or speed at which the information comes from the information storage area 68 is fixed and does not correspond to the bandwidth of the transmitter/receiver 64. The cache memory 66 serves to correlate these two speeds. It should be noted that the data channel includes data links 70 and 72 as well as the cache memory 66 and the transmitter/receiver 64 of the mass storage unit 46.

The mass storage unit 46 and the computer 48 comprise a computer system 47 as shown in FIG. 2. It is now common to transmit data and commands using infrared transmitters and receivers. If such an infrared transmitter/receiver is used, the data transmission is covered by a standard proposed by the Infrared Data Association (IrDA). The proposed IR standard promotes compatibility among IRDA compliant devices. Such compatibility allows a computer with a single IrDA transceiver to communicate with multiple IrDA devices such as printers, modems, fax machines, and even other IrDA-equipped computers. It should be noted the IrDA transceiver only communicates with one IrDA device at a time. The IrDA standard also specifies error checking and correction protocols and enables up to 4 mbs per second transfer rate. At the rate of 4 mbps, a one megabyte file can be transferred in 3 seconds. Of course, it should be noted that the transmitter/receivers can operate in any portion of the range of electromagnetic frequencies such as in the radio frequency band.

Figure 3:
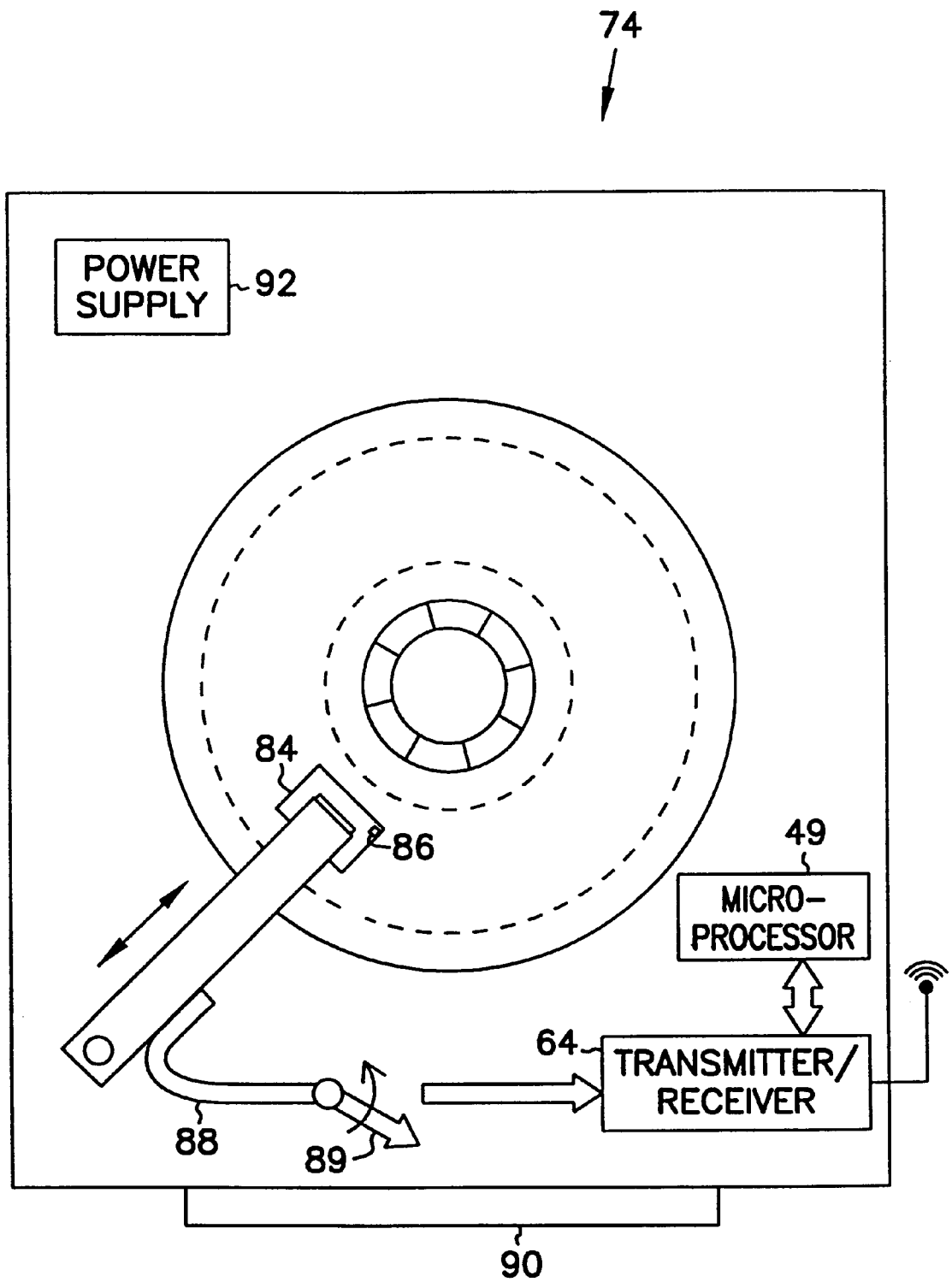
FIG. 3 is a block diagram of a disk mass storage device having a transmitter/receiver for wireless communication with a host computer.

Now turning to FIG. 3, a specific type of mass storage unit will now be described. It should be understood that any type of mass storage device can be used remotely, such as a CD-ROM drive, a magneto-optical drive, a hard drive or a card full of SRAM chips. In FIG. 3, a flexible or floppy disk drive 74 is shown as a representative mass storage device. Many of the details of a floppy or flexible disk drive are well known in the art and will not be described here. The floppy drive shown, like all mass storage devices, has a mechanism for accessing data. Attached at the end of an actuator arm is a slider 84 which carries a transducer 86. The slider passes over the disk 80 and places the transducer in transducing relationship to the disk. The disk includes a multiplicity of tracks which are typically invisible to the naked eye. The actuator arm is moved and controlled to place the transducer 86 over a particular desired track. Information can be read from or written to the floppy disk or remote mass storage device. In the case of reading information from the floppy, the transducer is electrically connected to circuitry 88 for amplifying the signal, decoding the signal and transferring the signal either to a cable connector 90 or to a transmitter/receiver 64. The electrical circuitry 88 includes a switch 89 to direct the signal either to the transmitter 64 or to the cable connector 90. In this particular disk drive 74, the information passing through the electrical circuitry 88 can be sent to a host computer either via the transmitter/receiver 64 or through the cable connector 90. In other words, the disk drive 74 shown in FIG. 3 can be either remote from the host computer or can be hard wired to the computer via the cable connector 90. If the drive operates without the cable connector 90, the disk drive must use a source of power 92 and an antenna to enable the operation of the disk drive and the related circuitry when used in remote mode. The drive also includes a microprocessor for controlling data flow and switching as well as other operations.

It should be noted that switch 89 could be eliminated along with the cable connector 90 to provide a floppy disk drive that is connected to the host computer via the transmitter/receiver 64. Transmitter 64 would then operate in a desired portion of the full spectrum of electromagnetic radiation to broadcast signals to and from the transmitter/receiver 60 of the host computer. Signals broadcast from the floppy disk drive to the computer, would represent the signal produced by the transducer 86 and the circuitry 88 for amplifying the signal, decoding the signal and transferring the signal from the floppy disk. Also, if the switch 89 is eliminated, the disk drive relies solely on the source of power 92 to enable the operation of the disk drive and the related circuitry.

Transmission of signals from or to a mass storage unit may require that the signals are decoded and converted to digital data streams. When using the RF portion of the full range of electromagnetic radiation, the transmitter/receiver 64 can be equipped with an RF transmitter to transmit signals via RF waves over a 900 MHz local transmission band extending from approximately 902 MHz to 928 Mhz. The transmitter/receiver 64 would also be equipped with a tuneable RF receiving unit for receiving the signals transmitted from one or the other of the RF transmitter/receivers. U.S. Pat. No. 5,349,386, entitled "Wireless Signal Transmission Systems, Methods, and Apparatus", describes one such transmission system for audio signals.

A device that broadcasts signals representative of data and commands must have error correction capability associated with the transmitter/receiver on each end of the transmission. It is very important to transmit data such as computer programs and financial information accurately. Error correction is provided via standard Viterbi and Reed Solomon algorithms. Cyclical Redundancy Checks can also be used as a form of error correction. The above error correction algorithms are designed to reduce the error rate for data to $10^{-2}$ errors per byte of data. The output of a transmitter comprises an encrypted signal in accordance with data encryption standards. Once received, the encrypted digital signal is supplied to error correction hardware which can detect and correct data in hardware or which sends the data to a microprocessor for software correction of an error. Some mass storage devices are equipped with error correction capabilities as part of the data channel on the disk drive. It is contemplated that the error correction capabilities of the drives could be used at the drive level rather than provide a duplicate capability with each transmitter/receiver.

Figure 4:
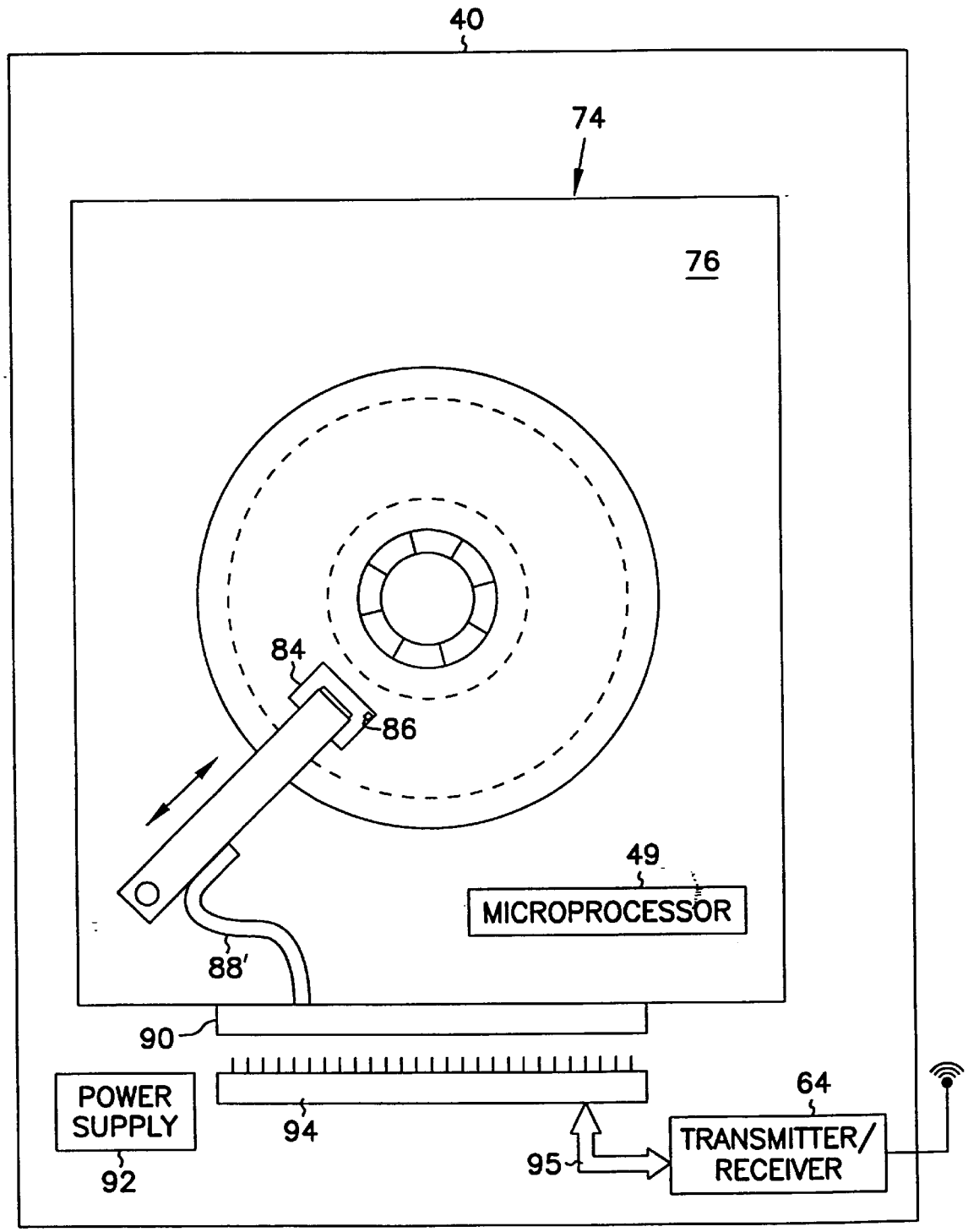
FIG. 4 is a block diagram of a disk mass storage unit in a cradle or nest with a transmitter/receiver for wireless communication with a host computer.

Now turning to FIG. 4, a cradle or nest 40 is shown. The cradle or nest 40 is typically for use with one type of mass storage device. For the sake of simplicity, a floppy disk drive 74 is shown in FIG. 4. Many of the parts of the floppy disk drive are known. Since many of the parts of a disk drive are known, the details of the floppy will not be described. The nest or cradle 40 includes a power supply 92, a transmitter/receiver 64 and a cable connector 94 which mates with cable connector 90 on the disk drive. In operation, the power supply 92 supplies power to the disk drive 74 and to the transmitter/receiver 64. The disk drive 74 fits within the nest or cradle 40. When in the nest or cradle 40, the cable connector 90 fits or mates with the cable connector 94 of the nest or cradle 40. The type cable connector 94 is dictated by the type of mass storage device that will be used in the cradle. For example, a connector for a floppy will differ from a connector for a CD-ROM drive. To accommodate a CD-ROM drive, an IDE type connector is used. A SCSI connector could be used to correct to various drives, however, SCSI drives are typically more expensive.

The cable connector 94 is electrically connected to carry signals to the transmitter/receiver 64. In operation, a transducer 86 produces signals from the disk drive 74 and electrical circuitry 88' carries the signals to the cable connector 90 of the disk drive 74. The signals are carried across the cable connector 90, to the cable connector 94 attached to the nest or cradle 40, and then through electrical circuitry 95 to the transmitter/receiver 64 where they are transmitted to the host computer (shown in FIG. 2). It should be noted that the cradle 40 can be used or adapted for use with any number of types of mass storage units 46 as long as a different connector 94 and different electrical circuitry 95 is used.

Figure 5:
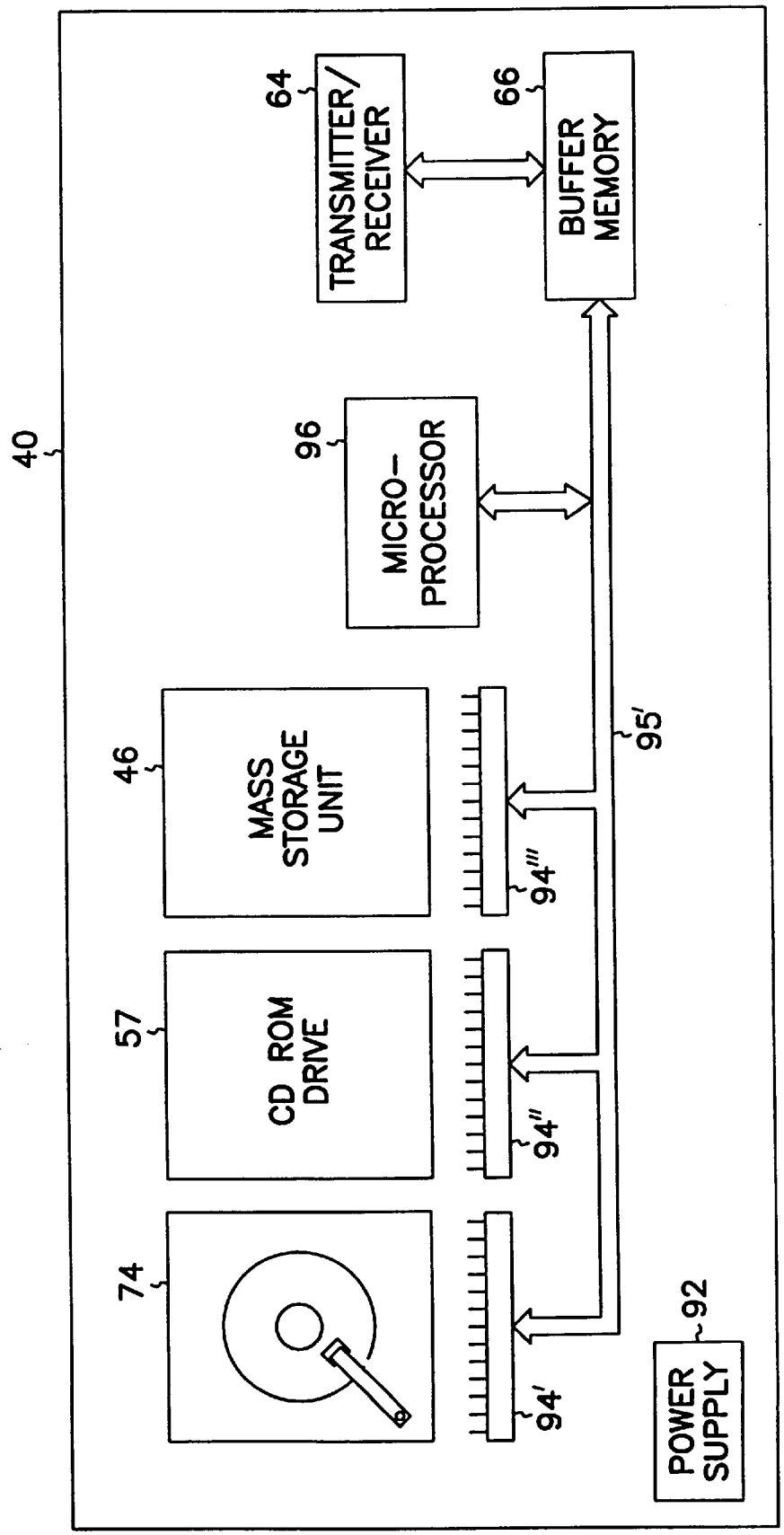
FIG. 5 is a block diagram of a cradle or nest capable of holding more than one mass storage device for wireless communication with a host computer.

Now turning to FIG. 5, a cradle or nest 40 capable of electrically attaching a plurality of mass storage units 46, 57 and 74, to the host computer is shown. The cradle 40 includes a power supply 92 and a transmitter/receiver 64, as well as a plurality of cable connectors 94', 94" and 94'". In a preferred embodiment, each of the cable connectors 94', 94" and 94''' are capable of connecting to one type of mass storage unit 46. The cradle 40 also includes a buffer memory 66. The buffer memory 66 is electrically connected to the transmitter/receiver 64. The cradle also includes a microprocessor 96 for controlling the flow of information and commands between the host and the cradle and the cradles mass storage units 74, 57, and 46. The microprocessor 96 can be a state machine, a controller, hardwired logic or a dedicated microprocessor. Electrical circuitry 95' connects each of the connectors 94', 94" and 94''' to the cache memory 66 and the microprocessor 96. A plurality of mass storage units 46 are attached to the various connectors. The power supply 92 supplies power to each of the mass storage units 46 shown in FIG. 5, which include a floppy disk drive 74 attached to connector 94', a CD-ROM 57 attached to connector 94", and a generic mass storage device 46 attached to connector 94'''.

In operation, the transmitter/receiver 64 can either receive commands and data from the host or deliver them to the host. Most commonly, a host computer will be sending two types of commands to a mass storage device. The first type is a write command where data that the host has must be written to a mass storage device. The second type is a read command where data that the host needs must be retrieved or read from a particular mass storage device. When receiving a write command from the host, the host will be sending data to be written to a specific mass storage unit 46. The microprocessor 96 associated with the nest or cradle 40 interprets the command and directs the data to the proper mass storage unit such as the CD-ROM 57 or disk drive 74 attached to one of the connectors 94', 94" or 94'''. When the host transmits a read command to the transmitter/receiver 64 of the cradle or nest 40, the microprocessor 96 determines where the data is stored or on which mass storage unit 46 the data is stored and then directs that mass storage unit to provide the data. Once provided, the microprocessor 96 controls the timing and the sending of the data over the transmitter/receiver 64 back to the host computer (not shown in FIG. 5, but shown in FIG. 2).

Figure 6:
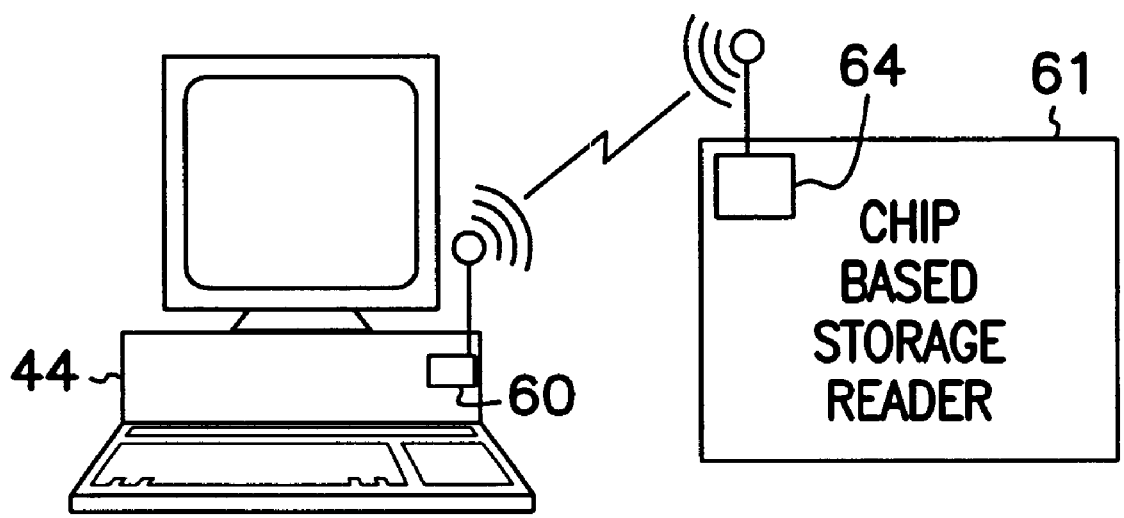
FIG. 6 is a block diagram of a computer system for wireless transmission of data which includes a non volatile chip mass storage device with a transmitter and receiver, and a computer with a transmitter and receiver.
Figure 7:
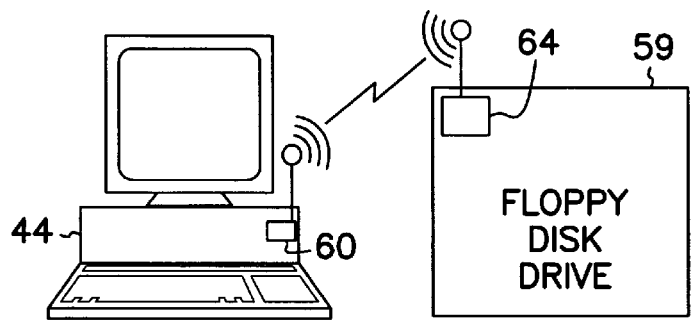
FIG. 7 is a block diagram of a computer system for wireless transmission of data which includes a floppy disk drive mass storage device with a transmitter and receiver, and a computer with a transmitter and receiver.
Figure 8:
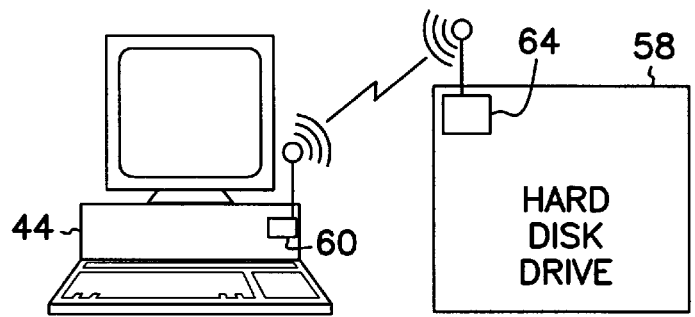
FIG. 8 is a block diagram of a computer system for wireless transmission of data which includes a hard disk drive mass storage device with a transmitter and receiver, and a computer with a transmitter and receiver.
Figure 9:
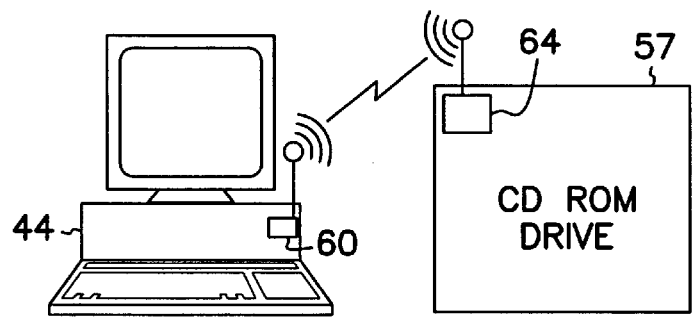
FIG. 9 is a block diagram of a computer system for wireless transmission of data which includes a CD-ROM mass storage device with a transmitter and receiver, and a computer with a transmitter and receiver.
Figure 10:
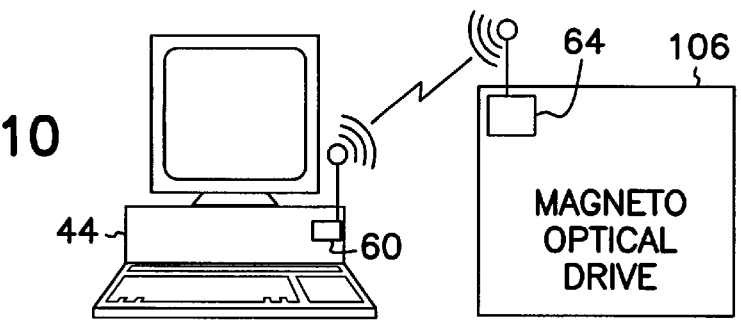
FIG. 10 is a block diagram of a computer system for wireless transmission of data which includes a magneto-optical disk drive mass storage device with a transmitter and receiver, and a computer with a transmitter and receiver.

FIGS. 6, 7, 8, 9, and 10 all show mass storage devices having transmitter/receivers communicating with a host computer 44 which also has a transmitter/receiver. FIG. 6 shows a non volatile chip based mass storage device 61 which is electrically connected to a transmitter/receiver 64 as it interacts with a remote computer and home entertainment system. The non volatile mass storage device 61 could be a circuit card populated with SRAMs (Static Random Access Memory Chips). Currently circuit cards populated with SRAMs provide 40 megabytes of non volatile storage. The non volatile mass storage device could be any other non volatile memory chip as well either singly or grouped on a circuit card. FIG. 7 shows a flexible disk drive 59, which is also known as a floppy disk drive which has a transmitter/receiver 64. FIG. 8 shows a hard disk drive 58 having a transmitter/receiver 64 which communicates with the host computer 44 having a similar transmitter/receiver 64. It should be noted that hard drives from manufacturers such as Syquest Technology have removable hard media and could be operated from locations remote from the computer home entertainment system. FIG. 9 shows a CD-ROM drive having a transmitter/receiver 64 which communicates with a host computer 44 having a similar transmitter/receiver 64. FIG. 10 shows a magneto-optical drive 106 having a transmitter/receiver 64 which is in communication with a computer 44 having a similar transmitter/receiver 64. It should be noted that any type of mass storage device can be provided or put into electrical contact with a transmitter/receiver 64 which in turn communicates or transmits signals to a similar transmitter/receiver 60 within a computer 44.

Now with respect to FIGS. 11, 12, 13, 14, and 15 a dual drive remote mass storage device 110 will now be discussed. The two types of drives in the dual drive mass storage device 110 are a floppy disk drive 112 and a CD-ROM disk drive 114. The floppy disk drive 112 is shown by the floppy disk drive opening 113. The internal elements of a floppy disk drive are not shown since there are many commercially available floppy drives available and applicant feels that such drives are ell known. The floppy also has an eject button 111 for ejecting the floppy disk (not shown) after it has been used.

Figure 11:
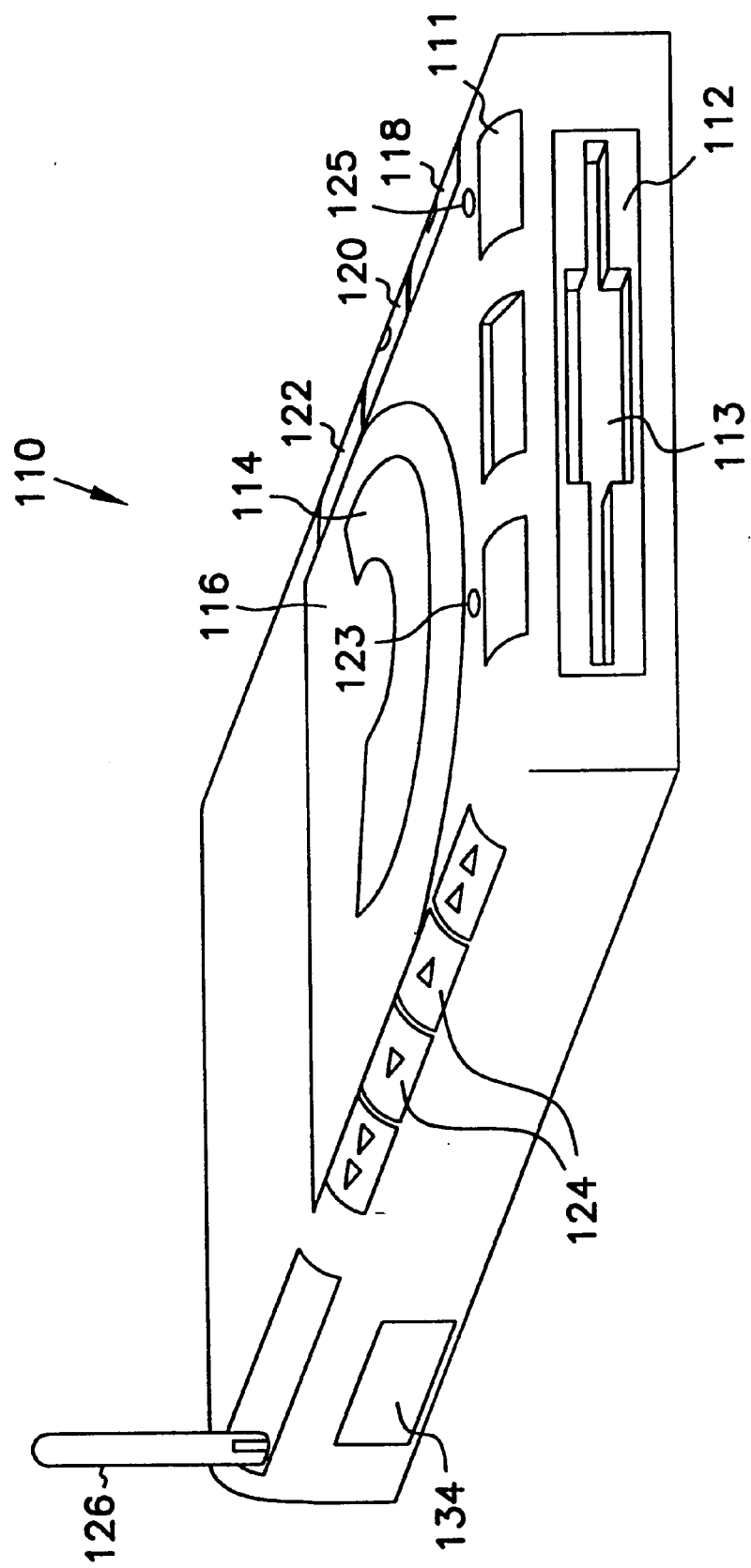
FIG. 11 is a perspective view of dual drive implementation of a mass storage unit with a pair of transmitter and receivers for wireless transmission.
Figure 14:
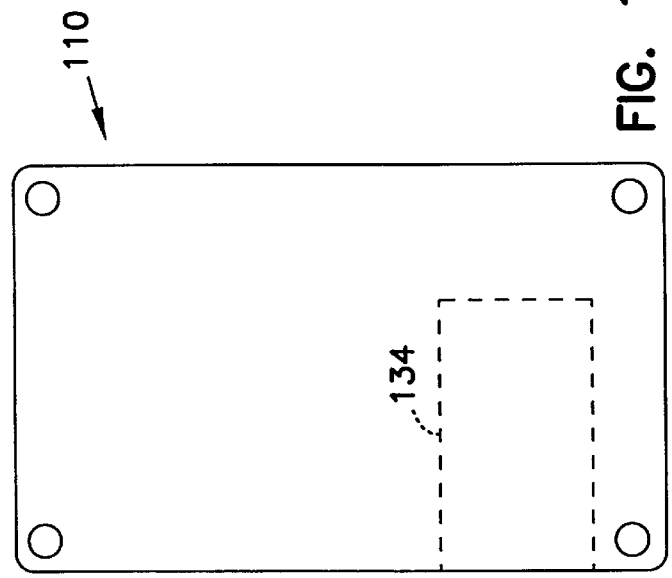
FIG. 14 is a bottom view of the dual drive implementation of a mass storage unit for wireless transmission shown in FIG. 11.
Figure 15:
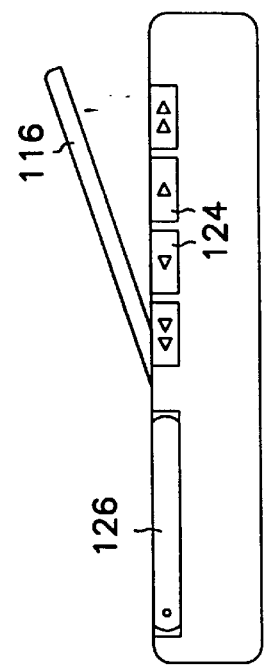
FIG. 15 is a side view of the dual drive implementation of a mass storage unit for wireless transmission shown in FIG. 11.
Figure 12:
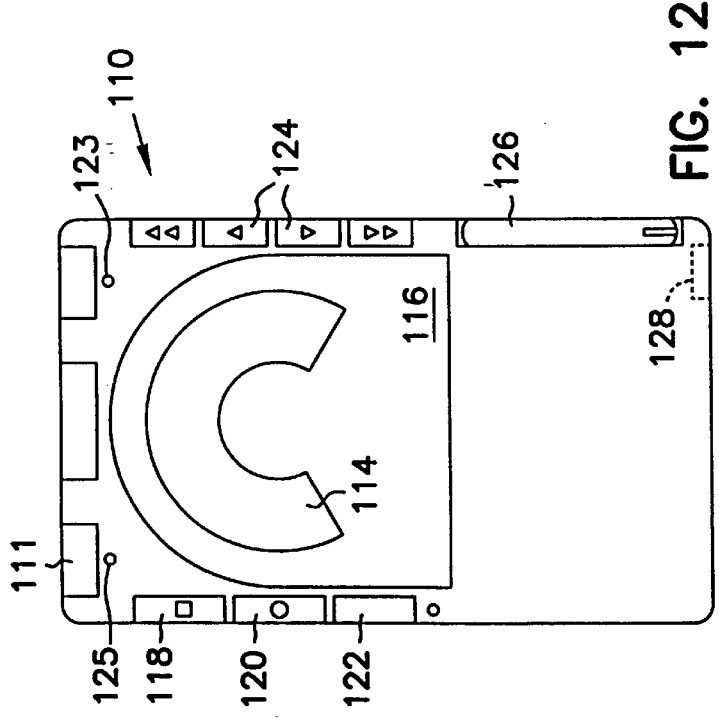
FIG. 12 is a top view of the dual drive implementation of a mass storage unit for wireless transmission shown in FIG. 11.

The other drive in the dual drive mass storage device 110 is a CD-ROM drive 114. A lid 116 opens as shown in FIG. 15, to allow the user to insert a CDROM disk (not shown) into the drive 114. Once inserted properly into the drive, the lid 116 is closed and the user can then operate the CD-ROM using a plurality of control buttons. The control buttons include a play button 118, a stop button 120, a power button 122, and a set of control buttons for skipping forward and backward 124. The dual drive also includes a small light such as a light-emitting diode or LED which indicates that the floppy disk drive 112 is in use and similarly it has an LED indicating that the CD-ROM drive 114 is in use. As shown in FIGS. 11–15, the dual drive mass storage device 110 also includes both an RF antenna 126 and an infrared or IR window 128. As a practical matter, the dual disk drive will be manufactured to include one type of interface with the computer. In other words, the dual disk drive will usually have the capability to either transmit via RF or via IR, but usually not both, as providing both would be cost prohibitive to consumers. An implementation with both is described as there may be some applications where this might be used. If the dual disk drive includes an RF antenna 126, it is hingedly attached to the dual drive mass storage device 110. In FIG. 12, and in FIG. 15, the RF antenna 126 is shown in its stowed or non deployed position. In FIG. 11, the RF antenna 126 is shown in its deployed or operating position. The user simply rotates the RF antenna 126 to the deployed position if the RF type transmitter/receiver 60 is going to be used by the host computer. It should be noted that an internal antenna can be used rather than an external antenna shown. With an internal antenna, there would be no need for an external antenna.

Figure 13:
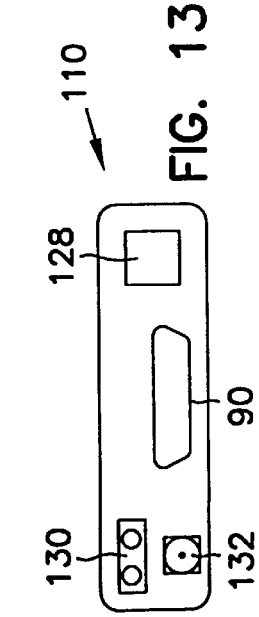
FIG. 13 is an end view of the dual drive implementation of a mass storage unit for wireless transmission shown in FIG. 11.

If the dual drive includes an IR window 128, it is located on the back side of the drive as is shown in FIG. 13. Also along the back side of the drive as shown in FIG. 15 are a full set of connectors which include audio jacks 130 and a DC power-in jack 132. The dual drive mass storage device 110 also includes a remote power system or battery pack 134 which provides power to either the floppy disk drive 112 or the CD-ROM drive 114. The battery pack 134 is best shown in FIG. 14 which is a bottom view of the dual drive mass storage device 110. The rechargeable battery pack 134 is shown with hidden lines since the battery pack is inside the dual drive mass storage device 110. Two LEDs (light emitting diodes) 123 and 125 mounted such that each can be seen by a user, indicate use of one or both of the drives.

Figure 16:
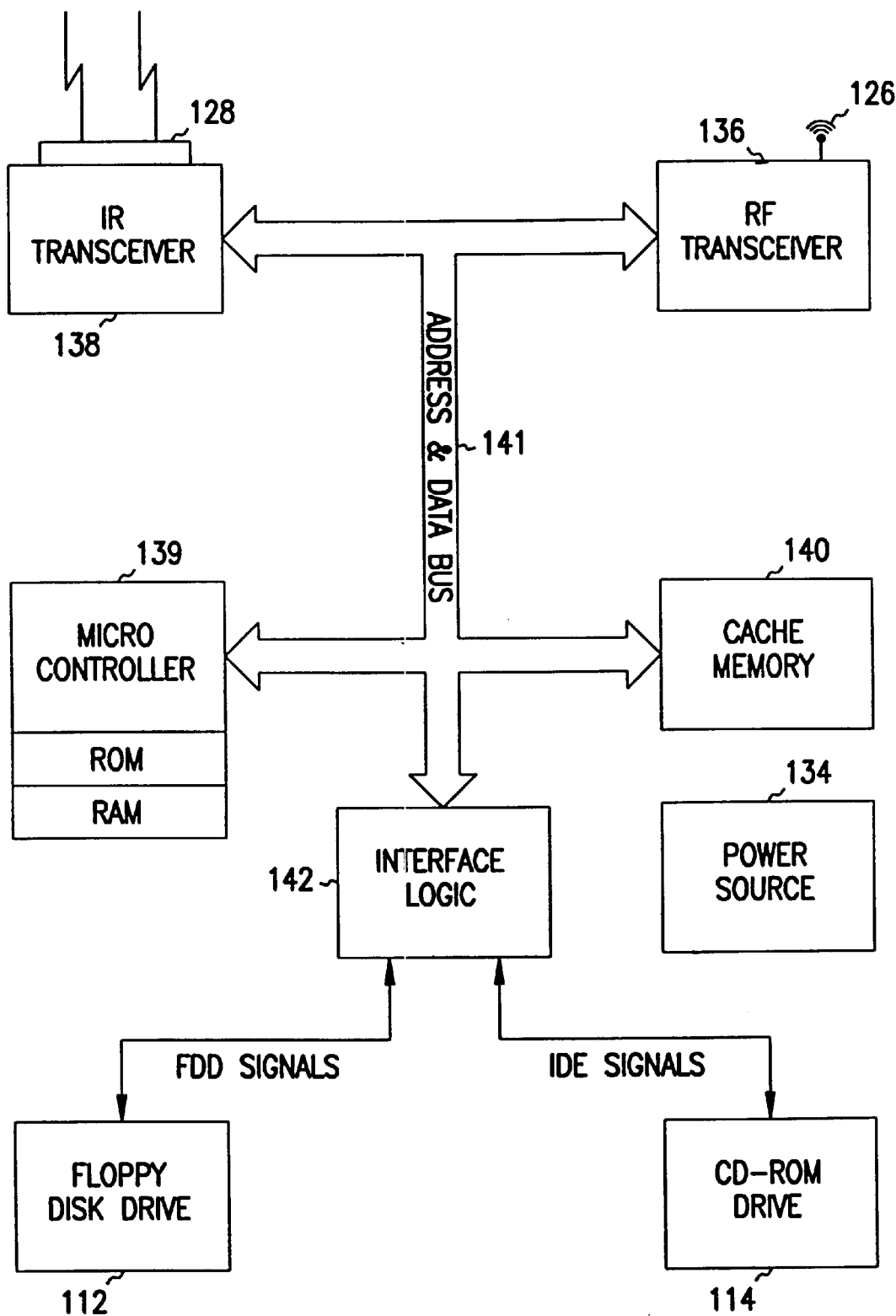
FIG. 16 is a block diagram of mass storage device having a pair data channels, each data channel having a cache memory and a separate transmitter and receiver.

Now turning to FIG. 16 we will discuss the internal workings of the dual drive mass storage device 110 shown in FIGS. 11–15. FIG. 16 shows the RF antenna 126 and the IR window 128 as well as the power source 134. As mentioned previously, only one of either the RF antenna or the IR window will be present in most dual drives, even though FIG. 16 shows both. One of ordinary skill in the art would know how to eliminate one or the other of the CD-ROM or the floppy 112. The RF antenna 126 is connected to an RF transmitter/receiver 136 and the IR window 128 is attached to an IR transmitter/receiver 138. The dual mass storage device 110 shown in FIG. 16 also includes the CD-ROM 114 and the floppy drive 112 and the power source 134 which is used to operate the dual drive mass storage device 110. FIG. 16 further includes a cache memory 140, a microcontroller 139, and interface logic and circuitry 142. An address and data bus 141 connects the IR transceiver or IR transmitter/receiver 138, the RF transceiver or RF transmitter/receiver 136, the cache memory 140, the interface logic and circuitry 142 with the microcontroller 139. The microcontroller controls the data flow between the transceivers 138 and 136 and the floppy disk drive 112 or CD-ROM drive 114. The microcontroller 139 controls the cache 140 and interface logic 142 to select the timing and the type of signals to send to the floppy drive 112 or the CD-ROM drive 114 during data write commands. Similarly during read commands, the microcontroller determines the location of the data, which interface circuitry to use and places the information in cache 140 before sending it over the bus 141 out one of the transceivers 138 or 136. It should be noted that the interfaces used for a floppy drive 112 and a CD-ROM drive 114 are different and this necessitates microprocessor-controlled interface logic 142. Thus, either drive can send or receive information via RF or IR transmissions. It is also contemplated that one drive could use the IR transmitter/receiver 138 while the other drive uses the RF transmitter/receiver 138.

Figure 17:
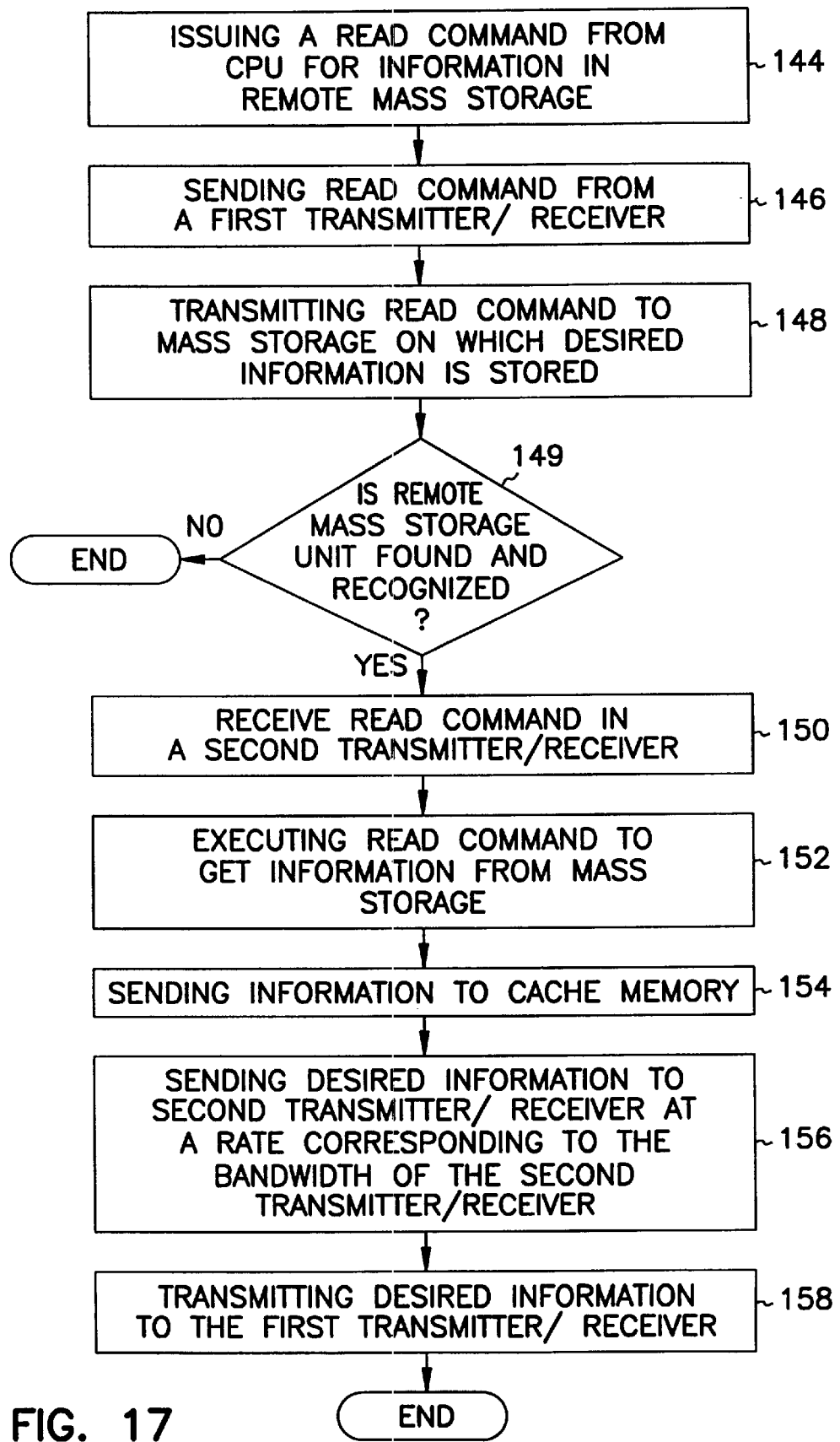
FIG. 17 is a block diagram showing the steps in making a wireless transmission.

Now turning to FIG. 17, the basic interaction between a computer (not shown in FIG. 17, but shown in FIG. 2) and a mass storage unit will be discussed in detail. In this particular example the computer sends a read command to a remote, wireless drive. It should also be noted that the computer could also send a write command. The basic operation is similar so applicant has omitted such an example for the sake of simplicity.

The initial step is that the CPU or microprocessor of computer issues a read command for information that is stored on a remote mass storage device, as shown by reference number 144. The next step is sending the read command to the first transmitter/receiver associated with the computer, as shown by reference number 146. The read command transmitter/receiver associated with the computer then transmits the amended command to the particular mass storage device, 148. This is done by sending a general broadcast. The first transmitter/receiver polls the receiver portion of the transmitter/receiver to find and recognize the remote storage unit which broadcasts a signal to the first transmitter/receiver, as depicted by step 149. If the remote mass storage device is found, the read command is sent and received in a second transmitter 150 associated with the remote mass storage unit. If the mass storage device is not found then the operation for the particular remote storage unit ends. The next step, depicted by step 152, then executes the read command by retrieving the designated information. The remote storage unit then sends the information to cache memory, as depicted by step 154. The desired information is then transmitted to the transmitter/receiver associated with the remote mass storage device at a rate that corresponds to the bandwidth associated with the transmitter/receiver, as shown by step 156. The information is then transmitted to the first transmitter/receiver associated with the computer, as shown by step 158. The operation then ends.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:

a central processing unit;

a data and command bus attached to said central processing unit for passing data and commands to and from said central processing unit;

a first transceiver attached to said data and command bus;

a remote mass storage device comprising:
   a cradle adapted to receive a mass storage device, wherein said cradle further includes:
      a second transceiver for receiving and sending commands and information representing data directly from and directly to said first transceiver of said computer system, said first and second transceivers operating in a selected range within the full spectrum of electromagnetic radiation;
      an interface for connecting said mass storage device to said second transceiver for receiving and sending commands and information representing data from said first transceiver of said computer system;

a source of power for said mass storage device independent of the computer system; wherein the central processing unit further includes means for identifying a particular mass storage device therein; and a link between the first transceiver and the second transceiver, said link for transmitting and receiving commands and information representative of data directly to and directly from a mass storage device, the first and second transceivers operating in a selected range of the full spectrum of electromagnetic radiation.

* * * * *